(12) United States Patent
Kato

(10) Patent No.: US 12,155,093 B2
(45) Date of Patent: Nov. 26, 2024

(54) BATTERY PACK

(71) Applicant: PRIME PLANET ENERGY & SOLUTIONS, INC., Tokyo (JP)

(72) Inventor: Masashi Kato, Konan (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 37 days.

(21) Appl. No.: 17/591,664

(22) Filed: Feb. 3, 2022

(65) Prior Publication Data

US 2022/0255205 A1    Aug. 11, 2022

(30) Foreign Application Priority Data

Feb. 8, 2021    (JP) ................... 2021-018119

(51) Int. Cl.
*H01M 50/593*      (2021.01)
*H01M 10/052*      (2010.01)
(Continued)

(52) U.S. Cl.
CPC ....... *H01M 50/593* (2021.01); *H01M 10/052* (2013.01); *H01M 10/0585* (2013.01); *H01M 10/613* (2015.04); *H01M 10/625* (2015.04); *H01M 10/655* (2015.04); *H01M 10/6553* (2015.04); *H01M 10/6554* (2015.04); *H01M 50/20* (2021.01); *H01M 50/204* (2021.01); *H01M 50/209* (2021.01); *H01M 50/211* (2021.01); *H01M 50/224* (2021.01); *H01M 50/24* (2021.01); *H01M 50/249* (2021.01); *H01M 50/51* (2021.01);
(Continued)

(58) Field of Classification Search
None
See application file for complete search history.

(56) References Cited

U.S. PATENT DOCUMENTS 10,340,498 B2 * 7/2019 Oh ................. H01M 10/0525
2003/0170535 A1   9/2003 Watanabe et al.
(Continued)

FOREIGN PATENT DOCUMENTS

JP    58-164145 A    9/1983
JP    59-138053 A    8/1984
(Continued)

*Primary Examiner* — Ula C Ruddock
*Assistant Examiner* — Mary Grace Byram
(74) *Attorney, Agent, or Firm* — Finnegan, Henderson, Farabow, Garrett and Dunner, LLP

(57) ABSTRACT

Provided is a battery pack capable of advantageously maintaining conduction. In the embodiment of the battery pack disclosed herein includes a stacked body in which a plurality of unit cells are stacked in a predetermined stacking direction, and a housing that accommodates the stacked body. An insulating member having an insulating property is arranged inside the housing. Here, a positive-negative electrode joint in which at least a part of the positive electrode terminal of one unit cell and at least a part of the negative electrode terminal of the other unit cell are joined to each other is present between the unit cells adjacent in the stacking direction, and the positive-negative electrode joints are embedded with the insulating member in order to prevent a liquid from penetrating from the outside.

11 Claims, 4 Drawing Sheets

(51) Int. Cl.

| | |
|---|---|
| *H01M 10/0585* | (2010.01) |
| *H01M 10/613* | (2014.01) |
| *H01M 10/625* | (2014.01) |
| *H01M 10/655* | (2014.01) |
| *H01M 10/6553* | (2014.01) |
| *H01M 10/6554* | (2014.01) |
| *H01M 50/20* | (2021.01) |
| *H01M 50/204* | (2021.01) |
| *H01M 50/209* | (2021.01) |
| *H01M 50/211* | (2021.01) |
| *H01M 50/224* | (2021.01) |
| *H01M 50/24* | (2021.01) |
| *H01M 50/249* | (2021.01) |
| *H01M 50/51* | (2021.01) |
| *H01M 50/516* | (2021.01) |
| *H01M 50/528* | (2021.01) |
| *H01M 50/531* | (2021.01) |
| *H01M 50/54* | (2021.01) |
| *H01M 50/543* | (2021.01) |
| *H01M 50/547* | (2021.01) |
| *H01M 50/55* | (2021.01) |

(52) U.S. Cl.
CPC ....... *H01M 50/516* (2021.01); *H01M 50/528* (2021.01); *H01M 50/531* (2021.01); *H01M 50/54* (2021.01); *H01M 50/543* (2021.01); *H01M 50/547* (2021.01); *H01M 50/55* (2021.01); *H01M 2220/20* (2013.01)

(56) References Cited

U.S. PATENT DOCUMENTS

| | | | |
|---|---|---|---|
| 2008/0160395 A1* | 7/2008 | Okada | H01M 50/553 |
| | | | 429/99 |
| 2010/0291419 A1* | 11/2010 | Zhou | H01M 10/613 |
| | | | 429/50 |
| 2011/0129700 A1* | 6/2011 | Hong | H01M 10/4207 |
| | | | 429/7 |
| 2011/0244296 A1 | 10/2011 | Okuda et al. | |
| 2012/0177960 A1 | 7/2012 | Tasai et al. | |
| 2012/0244403 A1* | 9/2012 | Maskew | B60L 3/108 |
| | | | 429/99 |
| 2013/0192058 A1 | 8/2013 | Watanabe et al. | |
| 2015/0072211 A1* | 3/2015 | Nakamura | H01M 50/509 |
| | | | 429/121 |
| 2016/0359211 A1* | 12/2016 | Kenney | H01M 10/6557 |
| 2017/0018746 A1* | 1/2017 | Kritzer | H01M 50/291 |
| 2018/0331336 A1 | 11/2018 | Choi et al. | |
| 2019/0109352 A1 | 4/2019 | Krämer | |
| 2020/0152932 A1 | 5/2020 | Ozawa et al. | |
| 2020/0277433 A1 | 9/2020 | Cho et al. | |
| 2021/0167446 A1 | 6/2021 | Lee | |
| 2021/0257693 A1 | 8/2021 | Lee | |
| 2022/0173484 A1* | 6/2022 | Kwon | H01M 50/503 |

FOREIGN PATENT DOCUMENTS

| | | |
|---|---|---|
| JP | 63-291361 A | 11/1988 |
| JP | 2004-087438 A | 3/2004 |
| JP | 2010-010381 A | 1/2010 |
| JP | 2011-210619 A | 10/2011 |
| JP | 2013-164975 A | 8/2013 |
| JP | 2015-022935 A | 2/2015 |
| JP | 2017-010944 A | 1/2017 |
| JP | 2019-508846 A | 3/2019 |
| JP | 2019-522322 A | 8/2019 |
| JP | 2020-532628 A | 11/2020 |
| WO | WO 2018/173860 A1 | 9/2018 |
| WO | WO 2020-111550 A1 | 6/2020 |
| WO | WO 2020-111564 A1 | 6/2020 |

* cited by examiner

BATTERY PACK

CROSS REFERENCE TO RELATED APPLICATIONS

This application claims priority to Japanese Patent Application No. 2021-018119 filed on Feb. 8, 2021, and the entire contents of that application are incorporated herein by reference.

BACKGROUND

The present disclosure relates to a battery pack.

A battery pack including a plurality of unit cells, each unit cell being a secondary battery such as a lithium ion secondary battery or a nickel hydrogen battery, or a power storage element such as a capacitor, is gaining importance as a power source to be mounted on a vehicle or a power source for a personal computer or a mobile terminal. In particular, a battery pack using a lithium ion secondary battery, which is lightweight and has a high energy density, as a unit cell is preferably used as a high-output power source to be mounted on a vehicle.

Such a battery pack typically includes a stacked body obtained by stacking a plurality of unit cells in a predetermined stacking direction and a housing in which the stacked body is accommodated, and the battery pack is constructed by electrically connecting the unit cells adjacent in the stacking direction via electrode terminals (positive electrode terminal and negative electrode terminal). For example, Japanese Translation of PCT Application No. 2019-508846 and Japanese Patent Application Publication No. 2013-164975 disclose a battery pack having such a configuration.

SUMMARY

The positive electrode terminal and the negative electrode terminal of the unit cell are often configured of different kinds of metals. Typically, the positive electrode terminals are configured of aluminum and the negative electrode terminals are configured of copper. Generally, when adjacent unit cells are electrically connected to each other, so-called dissimilar metal joining is performed in which a part of the positive electrode terminal of one unit cell and a part of the negative electrode terminal of the other unit cell are joined to each other. Since the positive-negative terminal joints formed by such joining are easily corroded by the adhesion of liquid from the outside (specifically, moisture etc. derived from the outside air, the same applies hereinbelow), the joining strength tends to decrease. The resultant disadvantage is that conduction is difficult to maintain for a long period of time.

The present disclosure has been made in view of such circumstances, and a main object thereof is to provide a battery pack in which conduction can be suitably maintained.

In order to achieve such an object, the present disclosure provides a battery pack including a stacked body in which a plurality of unit cells is stacked in a predetermined stacking direction, and a housing that accommodates the stacked body.

The unit cell includes an electrode body including a positive electrode and a negative electrode, and an exterior body accommodating the electrode body. Further, a positive electrode terminal and a negative electrode terminal electrically connected respectively to the positive electrode and the negative electrode are arranged outside the exterior body, and an insulating member having an insulating property is arranged inside the housing. Here, a positive-negative electrode joint in which at least a part of the positive electrode terminal of one unit cell and at least a part of the negative electrode terminal of the other unit cell are joined to each other is present between the unit cells adjacent in the stacking direction, and the positive-negative electrode joints are embedded with the insulating member in order to prevent a liquid from penetrating from the outside.

In the battery pack having such a configuration, the positive-negative electrode joints (that is, portions where dissimilar metal joining has been performed) are embedded with the insulating member in order to prevent a liquid from penetrating from the outside. As a result, corrosion of the positive-negative electrode joints can be prevented, such that conduction can be advantageously maintained.

In a preferred embodiment of the battery pack disclosed herein, the exterior body comprises a pair of rectangular wide surfaces, and the positive electrode terminal and the negative electrode terminal are arranged on one short side or long side of the wide surface.

In a battery pack including a unit cell having such a configuration, the positive electrode terminals and the negative electrode terminals are collectively arranged on one side, such that the amount of the insulating member used for embedding the positive-negative electrode terminal joints is reduced. Therefore, such a battery pack is preferable from the viewpoint of cost reduction and the like.

In a preferred embodiment of the battery pack disclosed herein, the insulating member is in contact with the inner wall of the housing.

With the configuration in which the insulating member is in contact with the inner wall of the housing, the resonance frequency of the positive-negative terminal joints embedded in the insulating member becomes high, such that the vibration resistance of the battery pack can be improved in addition to the effect of advantageously maintaining the conduction.

In the battery pack of such an embodiment, the insulating member preferably includes a resin matrix having thermal conductivity and an insulating property, and a filler member having thermal conductivity. Since the insulating member having such a configuration is excellent in thermal conductivity in addition to the insulating property, heat generated from the positive-negative terminal joints where power concentration tends to occur can be efficiently dissipated through the insulating member and the housing. Further, it is preferable to use a configuration in which the resin matrix includes a silicone resin, and the filler member includes alumina.

In the battery pack of such an embodiment, the housing is preferably configured of aluminum or an alloy mainly composed of aluminum.

Since the housing configured of aluminum or an alloy mainly composed of aluminum has excellent heat radiation property, the heat generated from the positive-negative terminal joints can be dissipated more efficiently.

In the battery pack of such an embodiment, a heat exchanger is preferably provided on the outer side of the inner wall where the insulating member is arranged in the housing.

With such a configuration, the heat generated from the positive-negative terminal joints can be dissipated more efficiently via the insulating member, the housing, and the heat exchanger.

In the battery pack of this embodiment, the exterior body is preferably composed of a laminated film.

When the exterior body is made of a laminated film, the positive electrode terminal and the negative electrode terminal are typically welded to the laminated film via a welding film configured of a resin material or the like. Such a welded portion may be opened due to the influence of heat generated from the positive-negative terminal joint. Therefore, an exterior body made of a laminated film is suitable as a target to which such a technique is to be applied.

DETAILED DESCRIPTION

Figure 1:
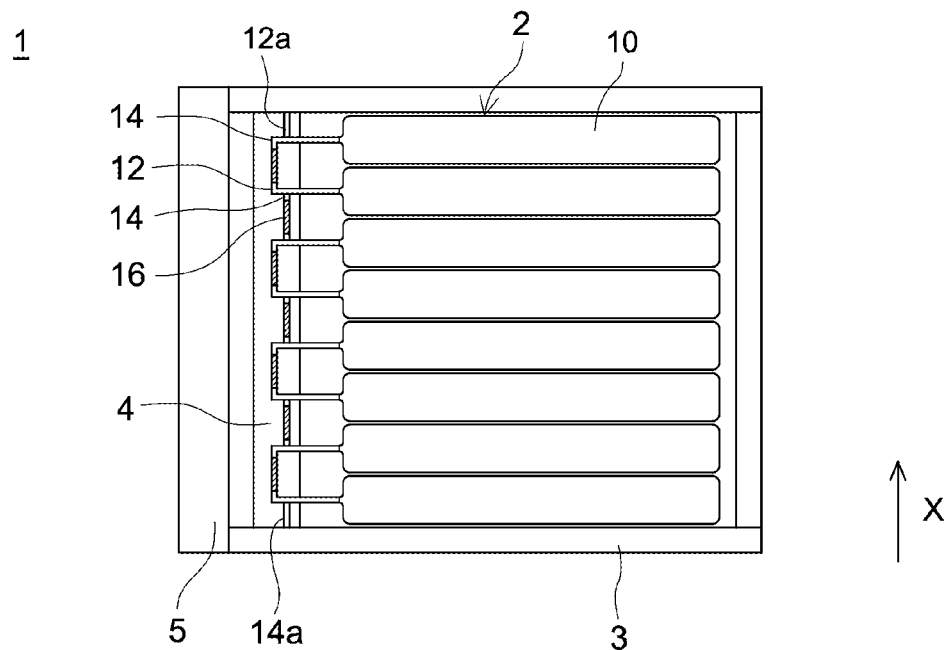
FIG. 1 is a schematic diagram for explaining the main configuration of a battery pack according to one embodiment.

Hereinafter, a preferred embodiment of the battery pack disclosed herein will be described in detail with reference to the drawings as appropriate. Matters other than those specifically mentioned in the present description and necessary for implementation can be ascertained as design matters for a person skilled in the art based on the prior art in the art. The present disclosure can be carried out based on the contents disclosed in the present description and common technical knowledge in the art. The following embodiments are not intended to limit the technique disclosed herein. Further, in the drawings shown in the present description, members and parts having the same action are denoted by the same reference symbols. Furthermore, the dimensional relationships (length, width, thickness, etc.) in each drawing do not reflect the actual dimensional relationships.

In the present description, the term "battery" generally refers to a power storage device capable of extracting electric energy, and is a concept inclusive of a primary battery and a secondary battery. The "secondary battery" refers to a general power storage device that can be repeatedly charged and discharged.

FIG. 1 is a schematic diagram for explaining the main configuration of a battery pack 1 according to an embodiment. As shown in FIG. 1, the battery pack 1 according to the present embodiment generally includes a stacked body 2, a housing 3 that accommodates the stacked body, an insulating member 4, and a heat exchanger 5. Hereinafter, each component will be described in detail.

Stacked Body 2

As shown in FIG. 1, the stacked body 2 according to the present embodiment has a configuration in which a plurality of (here, eight) unit cells 10 is stacked along a stacking direction X. First, the unit cell 10 constituting the stacked body 2 will be described with reference to FIG. 2. In the case described hereinbelow, an exterior body 18 included in the unit cell 10 is made of a laminated film, and the electrode body 20 is a laminated electrode body, but the exterior body and the electrode body are not intended to be limited to such types. The technique disclosed herein can also be applied, for example, when the exterior body is a metal battery case having a hexahedral box shape or the like. Further, the technique disclosed herein can also be applied, for example, when the electrode body is a wound electrode body in which a positive electrode sheet and a negative electrode sheet are wound with a separator interposed therebetween and molded into a flat shape.

Figure 2:
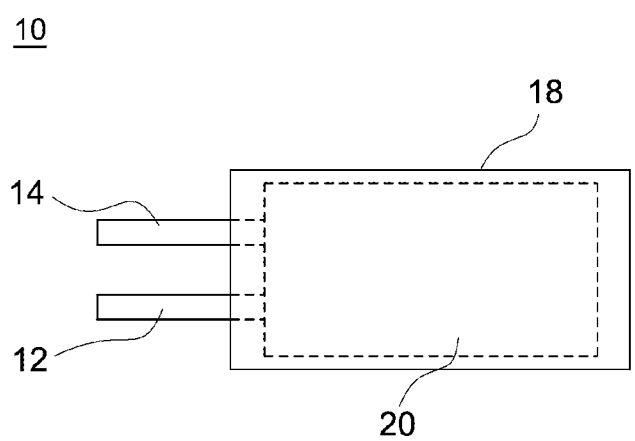
FIG. 2 is a plan view schematically showing the configuration of a unit cell included in the battery pack according to FIG. 1.

FIG. 2 is a plan view schematically showing the unit cell 10 included in the battery pack 1. As shown in FIG. 2, the unit cell 10 generally includes the electrode body 20 and an exterior body 18 accommodating the electrode body. By arranging the electrode body 20 between a pair of laminated films and welding the outer peripheral edge portions of the laminated films to form a welded portion (not shown), an exterior body 18 accommodating the electrode body is formed.

Although detailed illustration is omitted, the electrode body 20 according to the present embodiment is formed by laminating a plurality of positive electrode sheet (that is, positive electrodes) and negative electrode sheets (that is, negative electrodes) (hereinafter, collectively referred to as "electrode sheets") with a rectangular separator being interposed therebetween. Such an electrode sheet includes a current collector (that is, a positive electrode current collector and a negative electrode current collector), which is a foil-shaped metal member having a current collecting tab, and an electrode active material layer (that is, a positive electrode active material layer and a negative electrode active material layer) formed on the surface (one side or both sides) of the current collector. The current collecting tabs (that is, a positive electrode current collecting tab and a negative electrode current collecting tab) are exposed and do not have the electrode active material layer.

In the electrode body 20 according to the present embodiment, the positive electrode current collecting tab and the negative electrode current collecting tab extend in the same direction from different positions on one side edge of the electrode body. That is, on the side edge portion, a positive electrode terminal connection portion in which a plurality of positive electrode current collecting tabs are stacked and a negative electrode terminal connection portion in which a plurality of negative electrode current collecting tabs are stacked extend from different positions in the same direction. The positive electrode terminal 12 is connected to the positive electrode terminal connection portion, and the negative electrode terminal 14 is connected to the negative electrode terminal connection portion.

The unit cell 10 included in the battery pack 1 according to the present embodiment may be a fuel cell, an electric double layer capacitor, or a secondary battery such as a lithium ion secondary battery, a nickel hydrogen secondary battery, or a sodium ion secondary battery. When the unit cell 10 is a secondary battery, the unit cell may be, for example, a non-aqueous electrolyte secondary battery or an all-solid-state battery. In the case of a non-aqueous electrolyte secondary battery, an electrode body 20 in which an insulating separator is inserted between the electrode sheets is used, and a non-aqueous electrolytic solution is accommodated inside the exterior body 18. Meanwhile, in the case of an all-solid-state battery, an electrode body 20 in which a solid electrolyte layer (corresponding to a separator) is inserted between electrode sheets is used. As the members constituting the battery (specifically, electrode sheet, separator, electrode terminal, solid electrolyte layer, non-aqueous electrolytic solution, and the like), those that can be used for this type of secondary battery can be used without particular limitation. Further, the unit cell 10 can be manufactured based on a conventionally known method for manufacturing batteries.

Figure 3:
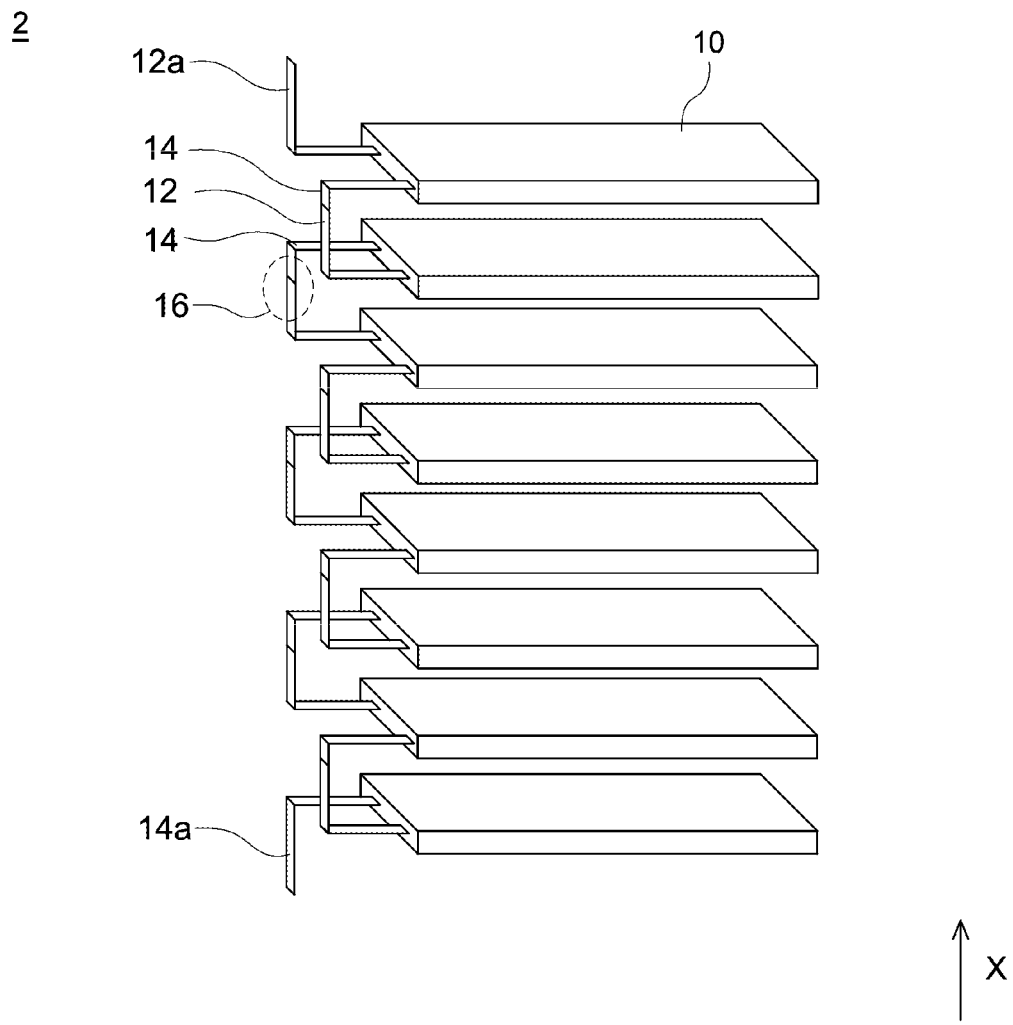
FIG. 3 is a schematic diagram for explaining the configuration of the stacked body included in the battery pack according to FIG. 1.

As shown in FIGS. 1 and 3, in the stacked body 2, the positions of the positive electrode terminals 12 and the negative electrode terminals 14 in the unit cell 10 are arranged so as to be alternately reversed along the stacking direction X. Between the unit cells 10 adjacent in the stacking direction X, there is a positive-negative electrode terminal joint 16 in which portions of the positive electrode terminal 12 of one unit cell 10 and of the negative electrode terminal 14 of the other unit cell 10 are joined to each other in a bent state. As a method for joining the positive electrode terminal 12 and the negative electrode terminal 14, a conventionally known method used for joining the electrode terminals can be used without particular limitation, and examples thereof include laser welding, resistance welding, and the like. Further, although detailed illustration is omitted, a part of the positive electrode terminal 12a in the unit cell 10 present on the uppermost side in the stacking direction X and a part of the negative electrode terminal 14a in the unit cell 10 present on the most downstream side in the stacking direction are pulled out to the outside of the housing 3 for external connection.

Housing 3

As shown in FIG. 1, the housing 3 according to the present embodiment is a hexahedral box-shaped container in which the stacked body 2 is accommodated. The housing 3 has a size sufficient to accommodate at least the stacked body 2. As a method for constructing the housing 3, for example, a method can be used in which after inserting the stacked body into a box-shaped container provided with an opening for inserting the stacked body 2, the lid is superposed and sealed in the opening. Such sealing can be performed, for example, by laser welding, resin-metal adhesion with a resin, or the like.

The material constituting the housing 3 is not particularly limited as long as the effect of the technique disclosed herein is exhibited, and examples thereof include aluminum, an alloy mainly composed of aluminum, an iron-aluminum (Fe—Al) alloy, stainless steel, nickel-plated steel, and the like. Among these, aluminum or an alloy mainly composed of aluminum can be preferably used from the viewpoint of small weight and excellent heat radiation property. Here, the aluminum may include various metallic elements, non-metallic elements and the like as unavoidable impurities. In this case, the purity of aluminum (that is, the content of aluminum component in aluminum) may preferably be 95% or more, 97% or more, and 99% or more (for example, about 99.5% or 99.8%). Further, the above-mentioned "alloy mainly composed of aluminum" means that among the components constituting the alloy, the component contained most in terms of weight is aluminum. Such an alloy may preferably contain 90% by weight or more, 95% by weight or more, or 99% by weight or more of aluminum. Examples of components other than aluminum include copper (Cu), magnesium (Mg), manganese (Mn), silicon (Si), zinc (Zn), and various other metal components.

Insulating Member 4

The insulating member 4 according to the present embodiment is arranged in contact with the entire surface of one inner wall of the housing 3. As shown in FIG. 1, the insulating member 4 according to the present embodiment has a hexahedral block shape and has a minimum thickness that makes it possible to embed the positive-negative electrode terminal joints 16 (in the present embodiment, also the positive electrode terminal 11a and the negative electrode terminal 14a). Since the insulating member 4 can prevent corrosion of the electrode terminals, the conduction can be advantageously maintained. Further, in addition to this effect, as a result of the positive-negative electrode terminal joints 16 (in the present embodiment, also the positive electrode terminal 12a and the negative electrode terminal 14a) being in physical contact with the housing 3 with the insulating member 4 interposed therebetween, resonance frequency thereof becomes high, such that the vibration resistance of the battery pack 1 can be improved. Further, the insulating member 4 according to the present embodiment has thermal conductivity. As a result, the heat generated from the positive-negative electrode terminal joints 16 (in the present embodiment, also the positive electrode terminal 12a and the negative electrode terminal 14a) can be efficiently dissipated through the insulating member 4 and the housing 3. Hereinafter, the materials constituting the insulating member 4 will be described.

First, a member having at least an insulating property and capable of preventing the penetration of liquid from the outside is adopted as the insulating member included in the battery pack disclosed herein. Here, the "having an insulating property" means having a property that electricity is unlikely to be conducted, and a volume resistivity measured based on, for example, JISK6911:2006 is typically $1.0 \times 10^{10}$ Ω·cm or more and preferably can be $1.0 \times 10^{12}$ Ω·cm or more, but it is not limited to this configuration.

A water absorption rate of the insulating member (that is, the degree of absorption of water or the like) measured based on, for example, JISK7209:2000 is typically 5.0% or less, and preferably can be 1.0% or less, and more preferably 0.5% or less, but it is not limited to this configuration.

Examples of the material constituting the insulating member included in the battery pack disclosed herein include silicone resins, epoxy resins (EP), polyurethanes (PU), acrylic resins (PMMA), melamine resins (MF), various fluororesins, and the like.

The insulating member 4 according to the present embodiment has thermal conductivity in addition to the above-mentioned properties. The thermal conductivity of the insulating member 4 measured, for example, based on JIS A 1412-1:2016 is typically 0.5 W/m K or more, preferably 1.5 W/m K or more, and more preferably 3.0 W/m K or more, but these ranges are not limiting.

Examples of the material constituting the insulating member 4 include silicone resins having excellent thermal conductivity among the resins listed above. Further, from the viewpoint of good thermal conductivity, for example, an insulating member including a resin matrix having insulating properties and a filler member having thermal conductivity can be preferably used. Examples of the resin matrix include the resins listed in the paragraph hereinabove, and these can be used alone or in combination of two or more as appropriate. Examples of the filler member include ceramic materials such as alumina ($Al_2O_3$), magnesia (MgO), silica ($SiO_2$), beryllia (BeO), zirconia ($ZrO_2$), boron nitride (BN), aluminum nitride (AlN), silicon nitride ($Si_3N_4$) and boehmite (AlOOH), and these can be used alone or in combination of two or more as appropriate. Among these, an insulating member including a silicone resin as the resin matrix and alumina as the filler member can be preferably used from the viewpoint of excellent thermal conductivity. It is preferable that the blending amounts of the resin matrix and the filler member be adjusted, as appropriate, according to the types of the resin matrix and the filler member.

The material constituting the insulating member 4, the thickness of the insulating member (here, the distance from the inner wall in contact with the insulating member 4 to the positive-negative electrode terminal joint 16), and the like can be determined as appropriate by performing preliminary tests. Further, although it is not intended to be interpreted in a limited manner, for example, when the battery pack 1 includes eight unit cells 10 having a capacity of about 200×3.7 Wh, the insulating member 4 having a volume resistivity of about $1.0 \times 10^{12}$ Ω·cm, a water absorption rate of about 1.0%, a thermal conductivity of about 1.0 W/m·K, and a thickness of the insulating member of about 8.0 mm can be used.

A method for arranging the insulating member 4 on the inner wall of the housing 3 is not particularly limited as long as the effects of the techniques disclosed herein are exhibited, but for example, as will be described hereinbelow, a method can be used in which a raw material of the insulating member 4 is filled from a filling hole 30 provided in the container 3a and cured (solidified) to form the insulating member 4.

Heat Exchanger 5

As shown in FIG. 1, the heat exchanger 5 according to the present embodiment is provided on the outer side of the housing 3 where the insulating member 4 is arranged. The type of such heat exchanger is not particularly limited as long as the effects of the technique disclosed herein are exhibited, and for example, a multi-tube heat exchanger (shell & tube heat exchanger; a plurality of thin circular pipes (tubes) is arranged in a thick cylindrical pipe (shell) and heat exchange is performed by allowing fluids with different temperatures to flow inside and outside the tubes), a plate type heat exchanger (metal plates (plates) pressed to have a concavo-convex shape are stacked and heat exchange is performed by allowing fluids with different temperatures to flow alternately therebetween), a fin-tube heat exchanger (a liquid medium is allowed to flow inside a circular pipe (tube), and heat exchange is performed by allowing a gas to flow on the outside of the tube and on the fins), and various other heat exchangers can be adopted. Such arrangement of the heat exchanger 5 is preferable because the heat generated from the positive-negative electrode terminal joints 16 (in the present embodiment, also the positive electrode terminals 12a and the negative electrode terminals 14a) can be more effectively dissipated.

Method for Constructing Battery Pack 1

A method for constructing the battery pack 1 according to the present embodiment will be described hereinbelow, but a method for constructing the battery pack 1 is not intended to be limited to the following method. In the following description, a case where the insulating member 4 including a silicone resin as the resin matrix and alumina as the filler member is used will be described. In addition, the order of steps in the following construction method can be changed as appropriate.

First, as shown in FIG. 3, a plurality of unit cells 10 (eight in this case) is prepared and stacked along the stacking direction X. Subsequently, positive-negative electrode terminal joints 16 (here, seven joints) are formed between the unit cells 10 adjacent along the stacking direction X by joining the positive electrode terminal 12 of one unit cell 10 and the negative electrode terminal 14 of the other unit cell 10 by laser welding in a bent state. The positive electrode terminal 12a of the unit cell 10 on the most downstream side in the stacking direction X and the negative electrode terminal 14a of the unit cell 10 on the most upstream side in the stacking direction are left without performing such joining for external connection.

Subsequently, the box-shaped container 3a having an opening for accommodating the stacked body 2 is prepared. Then, the stacked body 2 produced as described above is inserted into the container 3a. At this time, the positive electrode terminal 12a and the negative electrode terminal 14a are pulled out from the container 3a for respective external connection. A lid for sealing the opening is superposed on the opening of the container, and the periphery of the opening is welded and sealed by laser welding.

Figure 4A:
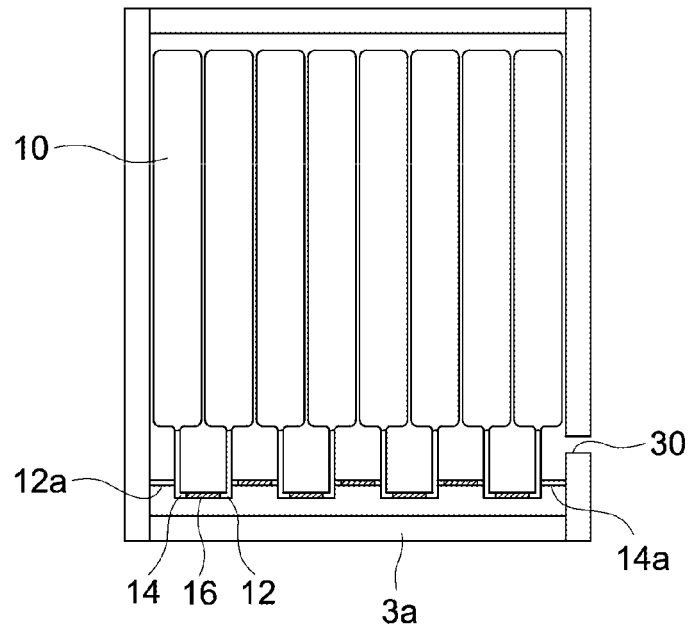
FIG. 4A is an explanatory view for explaining a method of forming an insulating member included in the battery pack according to FIG. 1.
Figure 4B:
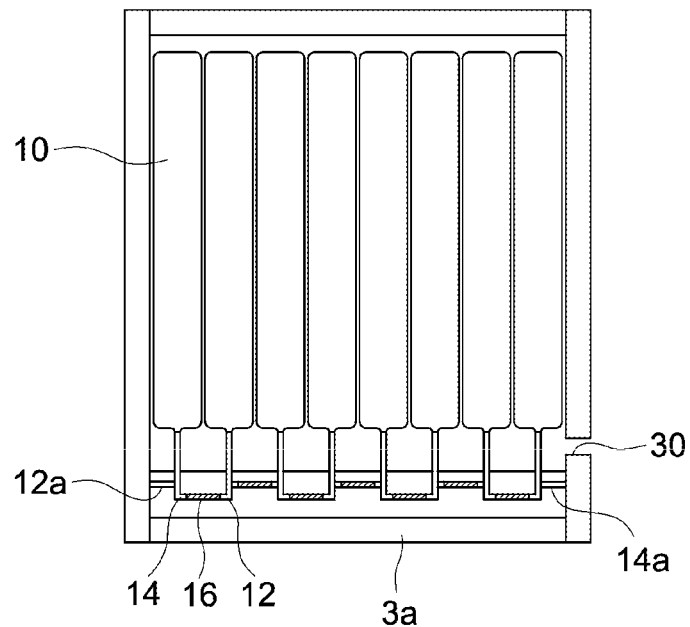
FIG. 4B is an explanatory view for explaining a method of forming an insulating member included in the battery pack according to FIG. 1.

Next, as shown in FIG. 4A and FIG. 4B, a predetermined amount of a silicone-alumina solution (corresponding to the main agent) is filled in the filling holes 30 of the container 3a. Then, a predetermined amount of a curing agent is added, curing is performed by mixing and stirring, and the filling hole 30 is sealed with a rivet. Information on the blending amount of the main agent and the curing agent, the mixing/stirring method, and the required time can be obtained from, for example, the distributor of the main agent and the curing agent. Further, such sealing can also be performed by resin-metal adhesion using a resin, sealing welding, or the like. Finally, the battery pack 1 can be constructed by installing the heat exchanger 5 on the outer side of the housing 3 where the insulating member 4 is arranged.

Modification Example

A specific example of the battery pack (method for constructing the battery pack) disclosed herein has been described in detail with reference to the battery pack 1, but the battery pack disclosed herein is not limited to such a specific example. The battery pack disclosed herein is inclusive of various modifications of the above-mentioned specific example as long as the purpose thereof is not changed. Hereinafter, modification examples (i) to (vi) of the battery pack 1 will be described.

(i) In the above embodiment, the insulating member 4 is arranged in contact with the entire surface of one inner wall of the housings 3, but the present disclosure is not limited to this configuration. The insulating member 4 may be provided, for example, only on the minimum necessary portion of one inner wall of the housing 3. Further, in the above embodiment, the insulating member 4 is arranged so as to embed the positive electrode terminal 12a and the negative electrode terminal 14a in addition to the positive-negative electrode terminal joints 16, but the present disclosure is not limited to this configuration. For example, the insulating member 4 may be arranged such that only one of the positive electrode terminal 12a and the negative electrode terminal 14a is embedded in addition to the positive-negative electrode terminal joints 16. As a matter of course, the effect of the technique disclosed herein can be exhibited in a mode in which the insulating member 4 is arranged so as to embed at least the positive-negative electrode terminal joint 16, and therefore the insulating member may be arranged so as to embed only the positive-negative terminal joint (the same applies to (ii) below).

Figure 5:
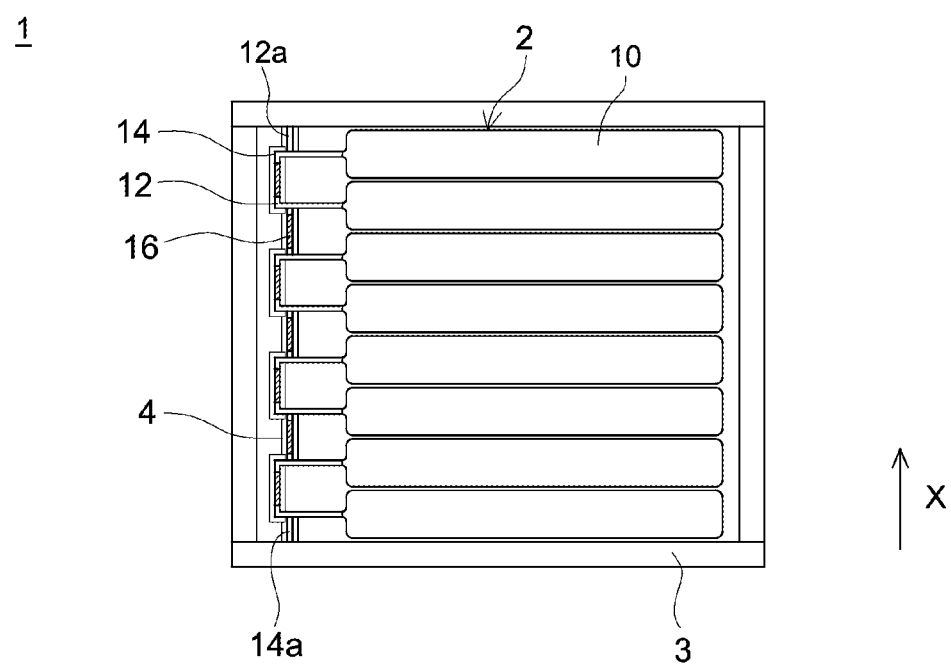
FIG. 5 is a schematic diagram for explaining the main configuration of the battery pack according to a modification example.

(ii) In the above embodiment, the insulating member 4 is continuously arranged along the stacking direction X, but the present disclosure is not limited to this configuration. The insulating members 4 may be arranged, for example, as shown in FIG. 5. Further, in this case, the size and shape of the individual insulating members 4 may be different as long as the effect of the technique disclosed herein is exhibited.

(iii) In the above embodiment, the hexahedral block-shaped insulating member 4 is used, but the present disclosure is not limited to this configuration. For example, the insulating member may have various shapes, for example, a cylindrical shape.

(iv) In the above embodiment, the insulating member 4 is provided to such an extent that the positive-negative electrode terminal joints 16 (positive electrode terminal 12a and negative electrode terminal 14a) are embedded at a minimum, but the present disclosure is not limited to this configuration. For example, the insulating member 4 may be provided up to a root portion (or near the root) where the positive electrode terminal 12 and the negative electrode terminal 14 are arranged in the unit cell 10.

(v) In the above embodiment, the configuration in which the battery pack 1 is provided with the heat exchanger 5 is described, but the effect of the technique disclosed herein can obviously be obtained when the battery pack 1 is not provided with the heat exchanger 5.

(vi) In the above embodiment, the unit cell 10 in which the positive electrode terminal 12 and the negative electrode terminal 14 are arranged on one short side of the exterior body 18 is used, but the present disclosure is not limited to this configuration. For example, a unit cell in which the positive electrode terminal 12 is arranged on one short side or long side of the exterior body 18 and the negative electrode terminal 14 is arranged on the side facing the one short side or long side can also be used. In such a case, insulating members 4 may be provided on both sides of the inner wall of the housing 3.

The battery pack 1 disclosed herein can be used for various purposes. An example of a suitable application is a drive power source mounted on a vehicle such as a battery electric vehicle (BEV), a hybrid electric vehicle (HEV), or a plug-in hybrid electric vehicle (PHEV). Among them, the battery pack can be preferably used particularly in a battery electric vehicle (BEV).

The invention claimed is:

1. A battery pack comprising:
a stacked body in which a plurality of unit cells are stacked in a predetermined stacking direction; and
a housing that accommodates the stacked body, wherein:
each of the plurality of unit cells includes:
an electrode body including a positive electrode and a negative electrode; and
an exterior body accommodating the electrode body, and
a positive electrode terminal and a negative electrode terminal electrically connected respectively to the positive electrode and the negative electrode are arranged outside the exterior body,
an insulating member having an insulating property is arranged inside the housing, wherein:
the insulating member as a whole has one of a hexahedral block shape or a cylindrical shape, and
a positive-negative electrode joint in which at least a part of the positive electrode terminal of one of the plurality of unit cells and at least a part of the negative electrode terminal of another one of the plurality of unit cells are joined to each other is present between the unit cells adjacent in the stacking direction, and the positive-negative electrode joints are embedded in the insulating member,
wherein a through hole is defined through a wall of the housing in the stacking direction and configured for the introduction of a raw material for forming the insulating member into the housing, and
the through hole is sealed with a rivet.

2. The battery pack according to claim 1, wherein:
the exterior body comprises a pair of rectangular wide surfaces, and
the positive electrode terminal and the negative electrode terminal are arranged on one short side or long side of the wide surface.

3. The battery pack according to claim 1, wherein:
the insulating member is in contact with the inner wall of the housing.

4. The battery pack according to claim 1, wherein:
the insulating member includes:
a resin matrix having thermal conductivity and an insulating property; and
a filler member having thermal conductivity.

5. The battery pack according to claim 4, wherein:
the resin matrix includes a silicone resin, and the filler member includes alumina.

6. The battery pack according to claim 1, wherein:
the housing is configured of aluminum or an alloy mainly composed of aluminum.

7. The battery pack according to claim 1, wherein:
a heat exchanger is provided on the outer side of the inner wall where the insulating member is arranged in the housing.

8. The battery pack according to claim 1, wherein:
the exterior body is composed of a laminated film.

9. The battery pack according to claim 1, wherein the through hole is positioned higher than a thickness of the insulating member in a direction orthogonal to the stacking direction.

10. The battery pack according to claim 1, wherein the water absorption rate of the insulating member as measured based on the Japanese Industrial Standard JIS K 7209:2000 is 1% or less.

11. The battery pack according to claim 1, wherein the insulating member is formed from a material that includes one or more of silicone resins, epoxy resins (EP), polyurethanes (PU), acrylic resins (PMMA), melamine resins (MF), and fluororesins.

* * * * *